QUASI-SQUARE WAVE GENERATING APPARATUS

Filed March 17, 1966 3 Sheets-Sheet 1

INVENTOR.
BYRON R. DUCKWORTH
BY
H P Terry
ATTORNEY

INVENTOR.
BYRON R. DUCKWORTH
BY
H P Terry
ATTORNEY

QUASI-SQUARE WAVE GENERATING APPARATUS

Filed March 17, 1966 3 Sheets-Sheet 3

INVENTOR.
BYRON R. DUCKWORTH
BY
H P Terry
ATTORNEY 3,476,957
QUASI-SQUARE WAVE GENERATING APPARATUS Byron R. Duckworth, Phoenix, Ariz., assignor to Sperry Rand Corporation, Great Neck, N.Y., a corporation of Delaware Filed Mar. 17, 1966, Ser. No. 535,144
Int. Cl. H03k 5/00; H03b 1/04; H06g 7/12
U.S. Cl. 307—261 11 Claims

ABSTRACT OF THE DISCLOSURE

A quasi-square wave generator comprising a signal source providing an input signal having an alternating characteristic. Two transistors responsive to the input signal are alternately energized with respect to each other as a function of the alternating characteristics of the input signal. An adjustable biasing circuit regulates the energization of the transistors thereby selecting the dwell angle of the quasi-square wave. The secondary winding of an output transformer with primary windings coupled to the two transistors provides the quasi-square wave signal.

The present invention relates to quasi-square wave generating apparatus and particularly of the type suitable for use in static inverters.

Many of the sine wave static inverters presently available use a filtered quasi-square wave approach for producing a low distortion, high efficiency sine wave output voltage. The quasi-square wave is obtained conventionally by various circuit techniques which include the summation of time delayed square waves. However, prior art methods obtain the time delay from digital logic or other complex circuit configurations. Further, the prior art circuits do not utilize a dwell angle which suppresses undesirable low level harmonic signals thereby requiring unduly large filter output stages to remove the aforementioned undesirable harmonics.

The present invention utilizes a minimum number of inexpensive components to produce a quasi-square wave generator having a minimum of undersirable low frequency harmonics thereby providing a distortion free quasi-square wave having the following advantages:

(1) Utilizes optimum dwell angle for cancelling third harmonic with provision for adjusting the dwell angle to minimize any desired harmonic of the output wave.

(2) Remaining harmonics may be filtered by smaller, more efficient components.

(3) By maintaining a constant dwell angle, the total harmonic distortion of the output waveform can be held to a very low percentage.

(4) Since the quasi-square wave is not distorted by the filtering components, an inverter can supply a low-harmonic-distortion sine wave to a wider range of power factor loads.

(5) The quasi-square wave is not distorted by reflected energy from the filtering components since inverter output impedance remains low during the dwell portion of the wave.

(6) A simple RC integrating circuit driving a differential amplifier is all that is required to produce a time delayed square wave.

(7) Power output transistors amplify the quasi-square wave while still operating as switches.

(8) Can utilize a standard aircraft DC voltage input (28 volts DC) to supply 115 volts 400 ~ output.

(9) Means for obtaining the phase shifted square wave is included.

It is a primary object of the present invention to provide a quasi-square wave generator which is inexpensive, and provides a distortion free quasi-square wave.

It is another object of the present invention to provide a quasi-square wave generator utilizing an optimum dwell angle for suppressing undesirable low frequency harmonics.

It is an additional object of the present invention to provide a quasi-square wave generator having means for adjusting the dwell angle.

These and other objects of the present invention will become apparent by referring to the drawings in which.

Figure 1:
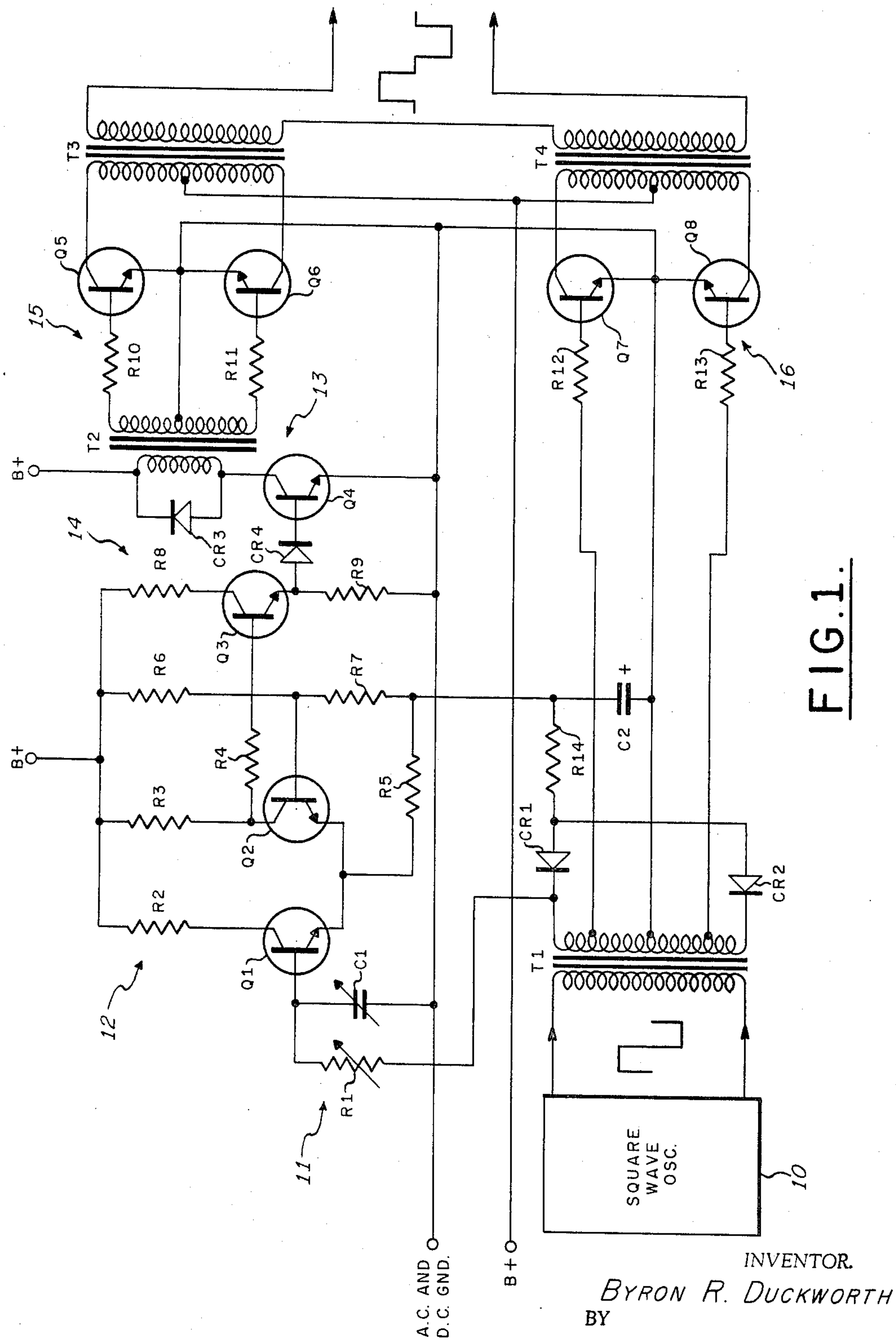
FIG. 1 is a schematic wiring diagram of a quasi-square wave generating apparatus constructed in accordance with a preferred embodiment of the present invention.
Figure 2:
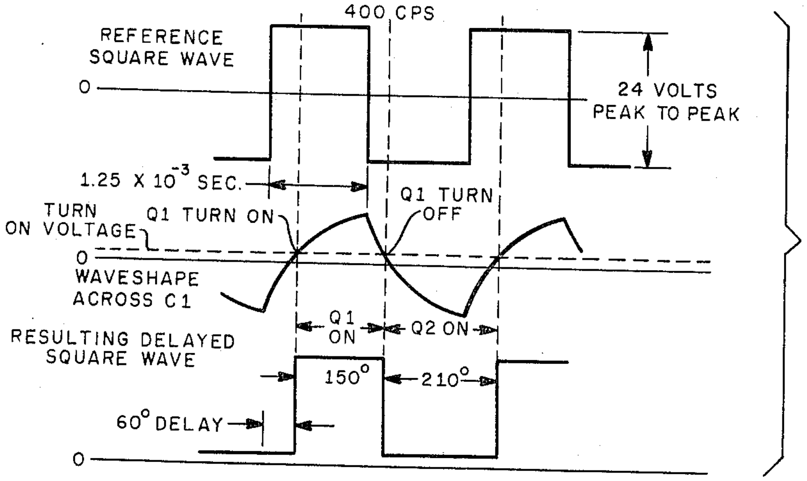
FIG. 2 is a graph showing the derivation of an unsymmertical delayed square wave utilizing the apparatus of FIG. 1.

Referring to FIG. 1, a square wave oscillator 10 is connected to the primary winding of a transformer T1 in order that an output voltage is supplied from one side of its center-tapped secondary winding to an RC integrating circuit 11 comprising a resistor R1 and a capacitor C1. The values of the variable resistor R1 and the variable capacitor C1 are selected such that the RC time constant permits the voltage charge on the capacitor C1 to rise to the required turn-on voltage for a bistable circuit such as a differential amplifier 12 comprising a transistor Q1, a transistor Q2, a resistor R2, a resistor R3, and a resistor R5. Due to the biasing arrangement of the differential amplifier 12, the transistor Q2 is normally conducting or ON until the charge on the capacitor C1 attains a sufficient level to turn the transistor Q1 ON thus forcing the transistor Q2 OFF or non-conducting. The transistor Q1 remains ON until the voltage across the capacitor C1 drops below the required turn on voltage at which time the transistor Q2 returns to the ON stage. As a result of the differential amplifier switching function, the wave shape at the collector of the transistor Q2 is a time delayed square wave as shown in FIG. 2. The amount of time delay is selected by adjusting the RC time constant.

Figure 3:
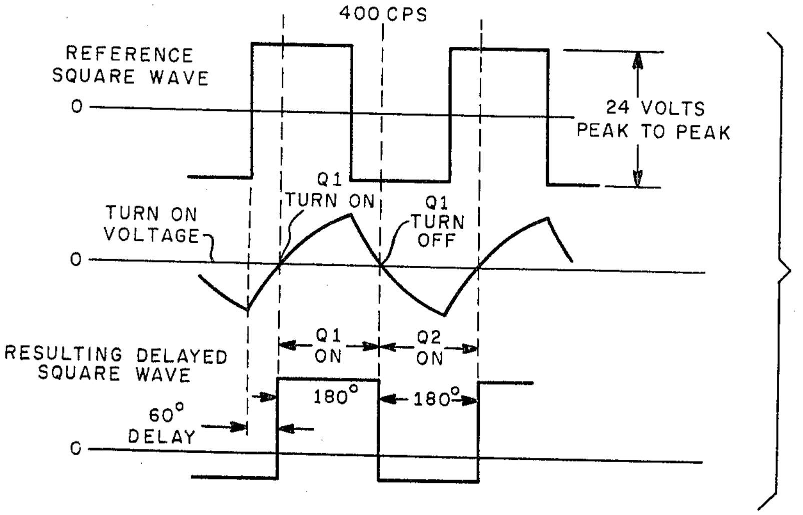
FIG. 3 is a graph showing the derivation of a symmertical delayed square wave with respect to the apparatus of FIG 1.
Figure 4:
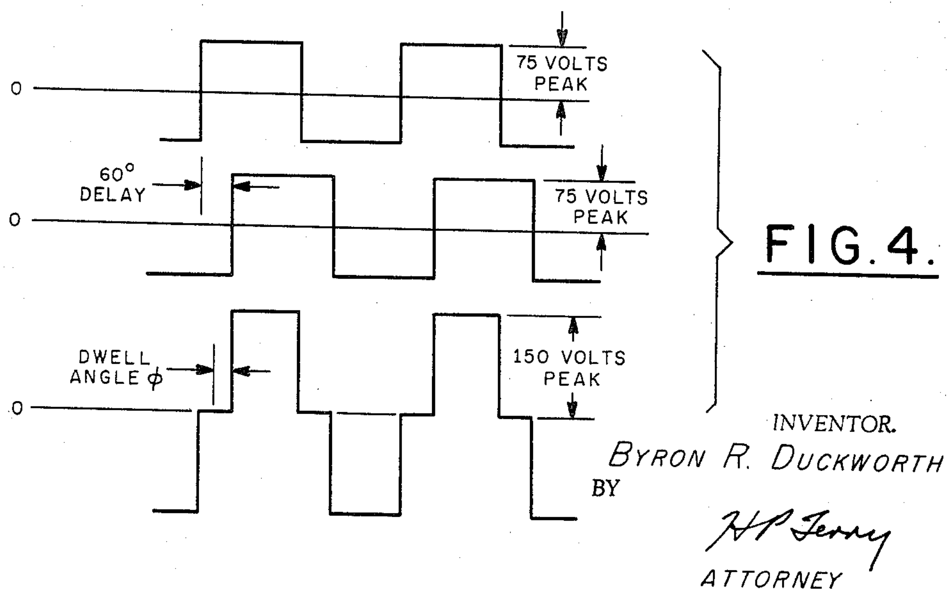
FIG. 4 is a graph showing a quasi-square wave resulting from summation of the square waves of FIGS. 2 and 3.

As seen in FIG. 2, the ON time for the transistor Q1 is not equal to that of the transistor Q2 thereby producing an unsymmetrical square wave. This condition is corrected by biasing the base of the transistor Q2 slightly negative with respect to ground potential by the use of resistors R6 and R7 such that the charge on the capacitor C1 holds the transistor Q1 on long enough to produce a symmetrical square wave as shown in FIG. 3. A negative DC supply voltage for the differential amplifier 12 is obtained by negatively rectifying and filtering the square wave output voltage of the transformer T1. The low-power-level time delayed square wave at the collector of the transistor Q2 is then amplified by a power amplifier 13 comprising a transistor Q4, a rectifier CR4, a transformer T2, and a rectifier CR3. An emitter-follower stage 14 comprised of a resistor R4, a resistor R8, a resistor R9, and a transistor Q3 is provided for load isolation between the differential amplifier 12 and the power amplifier 13. The time delayed square wave from the transformer T2 is used to drive an output stage 15 comprising a resistor R10, a resistor R11, a transistor Q5, a transistor Q6, and a transformer T3. A square wave referenced to time zero (to) from the transformer T1 is used to drive an output stage 16 consisting of a resistor R12, a resistor R13, a transistor Q7, a transistor Q8, and a transformer T4. The secondary windings of the transformers T3 and T4 are connected in series aiding to provide a quasi-square wave. By connecting the two output stages 15 and 16 in series, each stage supplies one-half the voltage level for the output wave shape as shown in FIG. 4.

The power amplifier 13 and the emitter-follower stage 14 together with the output stages 15 and 16 comprise a summing circuit for providing the quasi-square wave as explained.

By observing the Fourier expression for a square wave, $$E(\omega t)=\frac{4E_{max}}{\pi}\left(\sin\omega t+\frac{\sin 3\omega t}{3}+\frac{\sin 5\omega t}{5}+\dots\frac{\sin n\omega t}{n}\right) \quad (1)$$

it can be seen that only odd harmonics exist. With the elimination of the even harmonics due to the symmetry of the square wave, the classical method for obtaining a sine wave has been to utilize a filter to remove all remaining odd harmonics of the square wave. The filtering circuitry can be reduced in size and have increased efficiency if some of the harmonics are removed from the square wave before filtering. It is most desirable to remove the lower harmonics, since the higher the frequency of the harmonic, the smaller the filtering components to remove it.

The Fourier expression for a quasi-square wave can be derived as follows:

First, it can be seen that the D.C. component of the Fourier expression, $B_0$, is zero due to half-wave symmetry of the quasi-square wave. The coefficient of the fundamental of the wave $C_1$, is equal to $A_1$, since $$C_1=\sqrt{A_1^2+B_1^2}$$

and $B_1$ is zero due to horizontal wave symmetry. The coefficient, $A_1$, is determined as follows:

$$A_1=2\left[\frac{1}{2\pi}\int_0^{2\pi}f(a)\sin a\,da\right] \quad (2)$$

$$A_1=2\left[\frac{1}{2\pi}\int_{\phi}^{\pi-\phi}E_{max}\sin\theta d\theta+\int_{\pi+\phi}^{2\pi-\phi}-E_{max}\sin\theta d\theta\right] \quad (3)$$

Again, due to wave symmetry, the integral may be evaluated for only half the wave, or $$A_1=2\left[\frac{1}{\pi}\int_{\phi}^{\pi-\phi}E_{max}\sin\theta d\theta\right] \quad (4)$$

$$A_1=\frac{2}{\pi}\{E_{max}[-\cos(\pi-\phi)+\cos\phi]\} \quad (5)$$

$$A_1=\frac{2}{\pi}E_{max}[\cos\phi+\cos\phi] \quad (6)$$

$$A_1=\frac{4E_{max}}{\pi}\cos\phi \quad (7)$$

The coefficient of the third harmonic, $A_3$, is $$A_3=2\left[\frac{1}{\pi}\int_{\phi}^{\pi-\phi}E_{max}\sin 3\theta d\theta\right] \quad (8)$$

$$A_3=\frac{2}{\pi}\left\{E_{max}\left[\frac{-\cos 3(\pi-\phi}{3}+\frac{\cos 3\phi}{3}\right]\right\} \quad (9)$$

$$A_3=\frac{2}{\pi}E_{max}\left[\frac{\cos 3\phi}{3}+\frac{\cos 3\phi}{3}\right] \quad (10)$$

$$A_3=\frac{4E_{max}}{\pi}\frac{\cos 3\phi}{3} \quad (11)$$

The equations for the remaining harmonics take the form of the first and third, and therefore the Fourier expression for a quasi-square wave is given in Equation 12 as $$E\omega t=\frac{4E_{max}}{\pi}\left(\cos\phi\sin\omega t+\frac{\cos 3\phi\sin 3\omega t}{3}+\frac{\cos 5\phi\sin 5\omega t}{5}+\dots+\frac{\cos n\phi\sin n\omega t}{n}\right) \quad (12)$$

By observing Equation 12 it can be seen that the harmonic content of the wave is dependent upon the magnitude of the dwell angle, $\phi$. The dwell angle, $\phi$, as shown in FIG. 4, is one-half the time that the square wave remains at zero volts between each positive- and negative-going portion of the wave.

The third harmonic is completely cancelled at the angle of $\phi$ equal to 30 degrees. It can be determined by referring to Equation 12 that a dwell angle of $\phi$ equal to 30 degrees will not only cancel the third harmonic but also all remaining harmonics which are a multiple of the third. Therefore, the filter would be smaller and more efficient for an operating frequency of 400 c.p.s.. since the lowest frequency requiring filtering would be 2 kc. As a result of the cancellation of the third, ninth, fifteenth, etc., harmonics, the total harmonic content of the wave is reduced from approximately 47 percent to 30 percent. One other characteristic of the quasi-square wave that can be used to an advantage is the variation of the amplitude of the fundamental as a function of $\phi$. If the application of the inverter is such that the total harmonic distortion of the output wave can be as much as 5 percent (the normally accepted maximum), then the dwell angle can be varied up to $\pm 10$ degrees to obtain output voltage regulation.

The following equations describe the levels of square waves required to provide a quasi-square wave capable of supplying 115 volts RMS sine wave when filtered. From Equation 12 it can be seen that the amplitude of the fundamental is described by:

$$E\omega t=\frac{4E_{max.}}{\pi}\cos\phi \quad (13)$$

For a dwell angle, $\phi$, of 30° the $E_{max}$ required to provide 115 volts RMS is:

$$E_{max.}=\frac{E\pi}{4\cos\phi}=\frac{164(\pi)}{4\cos 30°}=148.5°\approx 150\text{ v.} \quad (14)$$

To provide 150 volts peak quasi-square wave, two 75 volt peak square waves are summed as shown in FIG. 4.

Figures 5, 6:
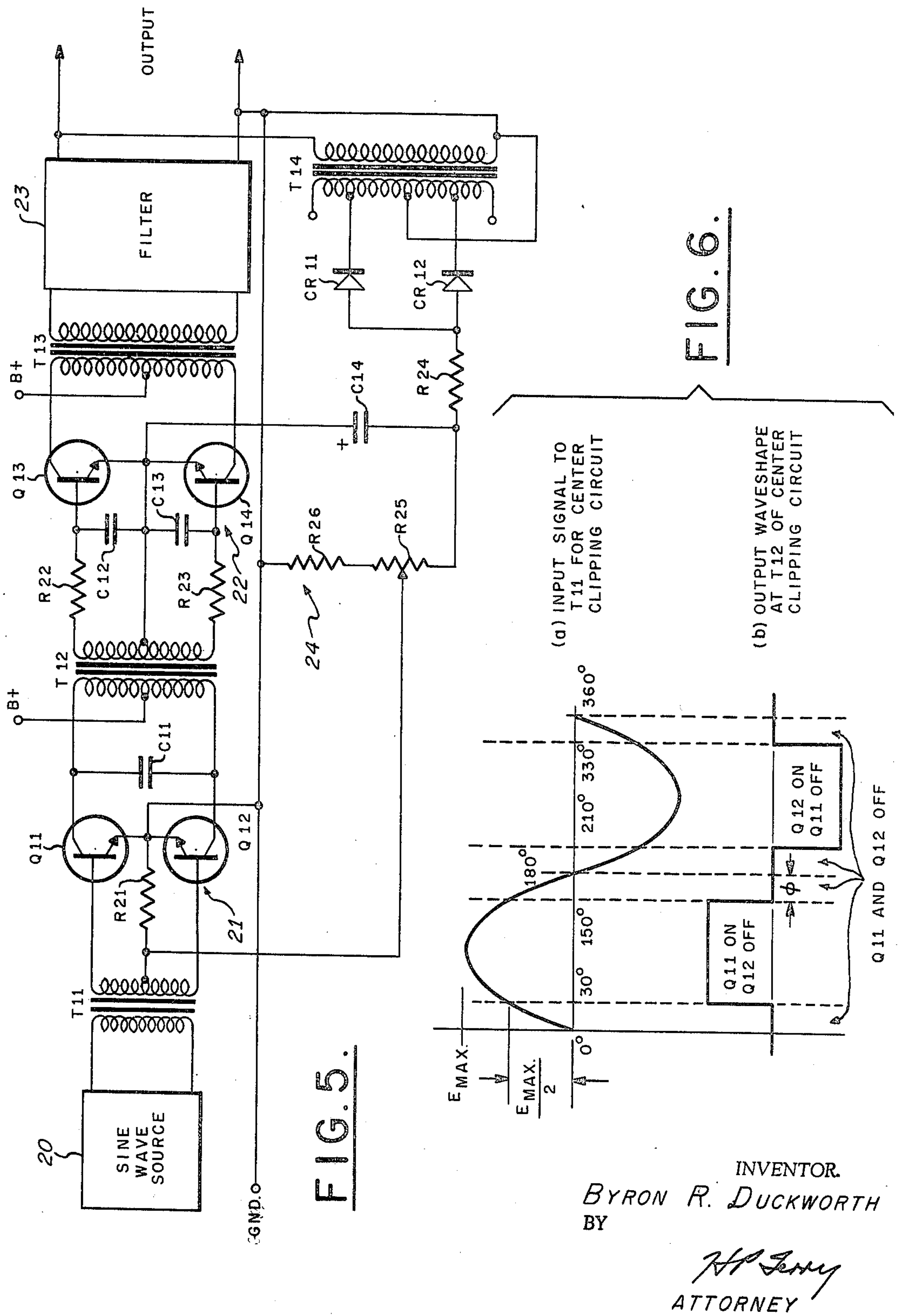
FIG. 5 is a schematic wiring diagram of another embodiment of a quasi-square wave generating apparatus constructed in accordance with the present invention.
FIG. 6 is a graph showing a quasi-square wave resulting from the embodiment of the invention shown in FIG. 5.

The embodiment of the invention shown in FIG. 5 involves the use of a center clipping circuit with a regulated reversed biased reference voltage to produce a pulse duration modulated squarewave having a constant dwell angle. By maintaining a constant dwell angle the harmonic content of the wave is known and may be more effectively filtered. This is then amplified and filtered to produce a sinusoidal wave.

Referring to FIG. 5, a signal level sine wave voltage from a source 20 is applied to the primary winding of a transformer T11. This voltage is coupled to the secondary winding of the transformer T11 where it applies a bias voltage alternately to the bases of switching transistors Q11 and Q12 which form a portion of a differential amplifier 21. In addition to the voltage applied to the bases of transistors Q11 and Q12 from the transformer T11, a D.C. voltage is impressed across a resistor R21, in a manner to be more fully explained. The D.C. voltage across the resistor R21, i.e., $V_{R21}$, has a polarity of plus (+) at the junction of the emitters of the transistors Q11, Q12 with respect to minus (−) at the center tap of the secondary winding of the transformer T11 where it is connected. This voltage prevents either transistor Q11 or Q12 from being switched on until the sinusoidal voltage from the transformer T11 rises to a voltage level greater than $V_{R21}+V_{beQ11}$ or $V_{R21}+V_{beQ12}$.

The wave shapes shown in FIG. 6 indicate that if $V_{R21}+V_{beQ11}=E_{max}/2$ then the dwell angle of the quasi-square wave is equal to 30 degrees.

The quasi-square wave obtained at the collector of the transistor Q11 with respect to the collector of the transistor Q12, as shown in FIG. 6b, is applied to a transformer T12. A source of D.C. potential, designated by the legend B+, is connected to the centertap of the primary winding of the transformer T12. Current from this potential source is alternately switched in opposite directions through the primary winding of the transformer T12 by the alternating switching action of the transistors Q11 and Q12. A capacitor C11 connected across the primary winding of the transformer T12 aids in maintaining a distortion free wave. Resistors R22 and R23, capacitors C12 and C13, transistors Q13 and Q14, and transformer T13 form a push-pull power amplifier stage 22 which receives the quasi-square wave from the transformer T12 and supplies an output quasi-square wave of the desired voltage level to a filter circuit 23.

The sine wave output voltage from the filter 23, which may be regulated by conventional means is sampled by connecting the primary winding of a transformer T14 across the output of the filter 23. The voltage at the secondary winding of the transformer T14 is rectified and filtered by rectifiers CR11, CR12, resistor R24, and capacitor C14.

Resistors R25 and R26 form an adjustable voltage divider 24 which provides a regulated, negative with respect to ground, D.C. voltage feedback for the resistor R21. The resistor R25 may be adjusted to obtain the desired dwell angle, then once the circuit is in operation, the dwell angle, and therefore the output wave harmonics, are maintained constant, in a manner similar to that explained above with respect to the embodiment of FIG. 1.

What is claimed is:

1. Quasi-square wave generating apparatus comprising
   - input signal source means for providing an input signal having an alternating characteristic,
   - input transformer means having primary winding means and secondary winding means wherein said primary winding means is coupled to said input signal source,
   - differential amplifying means including first and second amplifiers coupled to said secondary winding means of said input transformer means, said first and second amplifiers being alternately energized with respect to each other as a function of said alternating characteristic of said input signal,
   - biasing means connected between said secondary winding means of said input transformer means and said differential amplifying means for regulating the energization of said amplifiers wherein said biasing means includes adjusting means for selecting a dwell angle to minimize a particular undesired harmonic, and
   - output transformer means having primary winding means responsive to said differential amplifying means for providing a quasi-square wave from its secondary winding means.

2. Quasi-square wave generating apparatus comprising
   - input signal source means for providing an input square wave signal,
   - integrating means responsive to said input signal source means for providing a sawtooth wave signal synchronous with respect to said input square wave signal,
   - bistable means responsive to said integrating means for providing a first potential whenever the magnitude of said sawtooth wave signal is not in excess of a predetermined magnitude and a second potential whenever the magnitude of said sawtooth wave signal is in excess of said predetermined magnitude,
   - said first and second potentials comprising a square wave signal delayed in time with respect to said input square wave signal, and
   - summing means responsive to said input signal source means and to said bistable means for providing a quasi-square wave signal representative of the summation of said input square wave signal and said delayed square wave signal.

3. Apparatus of the character recited in claim 2 in which said bistable means includes differential amplifier means comprising first and second transistors wherein the base electrode of said first transistor is coupled to said integrating means and the collector electrode of said second transistor is coupled to said summing means for providing said delayed square wave signal.

4. Apparatus of the character recited in claim 3 in which said integrating means comprises an RC integrating circuit having a time constant associated with a desired dwell angle.

5. Apparatus of the character recited in claim 4 in which said summing means comprises first and second output transformers wherein
   - the primary winding of said first output transformer is responsive to said input square wave signal,
   - the primary winding of said second output transformer is responsive to said delayed square wave signal, and
   - the secondary windings of said first and second output transformers are connected in series aiding for providing a quasi-square wave signal representative of the summation of said input square wave signal and said delayed square wave signal.

6. Apparatus of the character recited in claim 5 in which said time constant of said RC integrating circuit is adjustable for selecting a dwell angle to minimize a particular undesired harmonic of said quasi-square wave signal.

7. Quasi-square wave generating apparatus comprising
   - input signal source means for providing an input signal having an alternating characteristic,
   - input transformer means having primary winding means and secondary winding means wherein said primary winding means is coupled to said input signal source means,
   - first and second controlled switches coupled to said secondary winding means of said input transformer means for being alternately rendered conductive with respect to each other as a function of said alternating characteristic of said input signal,
   - output transformer means having primary winding means and secondary winding means wherein said primary winding means is coupled to said switching means,
   - a source of D.C. potential coupled to said primary winding means of said output transformer means for providing current flow therethrough alternately in opposite directions in response to the alternating conduction of said controlled switches, and
   - biasing means coupled to said secondary winding means of said output transformer means for providing a feedback signal to said controlled switches for regulating the energization thereof thereby providing a quasi-square wave signal from said secondary winding means of said output transformer means.

8. Apparatus of the character recited in claim 7 in which said first and second controlled switches comprises first and second transistors respectively having their emitter electrodes connected to each other, their base electrodes connected respectively to opposite extremities of said secondary winding means of said input transformer means, and their collector electrodes connected respectively to opposite extremities of said primary winding means of said output transformer means.

9. Apparatus of the character recited in claim 8 in which said biasing means includes rectifying means coupled to said secondary winding means of said output transformer means for rectifying said quasi-square wave signal to provide said feedback signal for maintaining a constant dwell angle.

10. Apparatus of the character recited in claim 9 further including a capacitor connected across said primary winding means of said output transformer means.

11. Apparatus of the character recited in claim 10 in which said feedback signal is adjustable for selecting a dwell angle to minimize a particular undesired harmonic of said quasi-square wave signal.

References Cited

UNITED STATES PATENTS

| | | | |
|---|---|---|---|
| 1,853,678 | 4/1932 | Gage | 328—165 |
| 2,308,752 | 1/1943 | Hadfield | 328—21 |
| 2,536,641 | 1/1951 | Haynes | 328—21 |

| | | | |
|---|---|---|---|
| 3,002,142 | 9/1961 | Jensen | 328—186 XR |
| 3,175,160 | 3/1965 | Pintell | 307—261 XR |
| 3,215,860 | 11/1965 | Neumann | 307—227 |
| 3,305,729 | 2/1967 | Stein | 307—261 XR |

FOREIGN PATENTS

| | | |
|---|---|---|
| 703,144 | 2/1965 | Canada. |

DONALD D. FORRER, Primary Examiner

STANLEY T. KRAWCZEWICZ, Assistant Examiner

U.S. Cl. X.R.

328—21, 156, 165